Dec. 7, 1948. S. P. LEEPER 2,455,372
PORTABLE GUN SIGHT RETICULE PRODUCING APPARATUS
Filed March 24, 1944 2 Sheets-Sheet 1

INVENTOR
SAM P. LEEPER
BY Joseph C. Hazell
and Clade Koontz
ATTORNEYS

Dec. 7, 1948.  S. P. LEEPER  2,455,372
PORTABLE GUN SIGHT RETICULE PRODUCING APPARATUS
Filed March 24, 1944  2 Sheets-Sheet 2
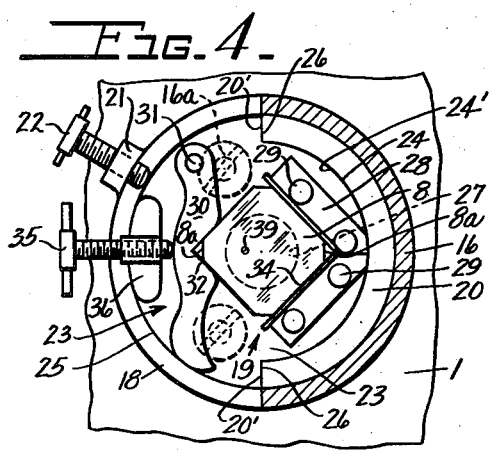
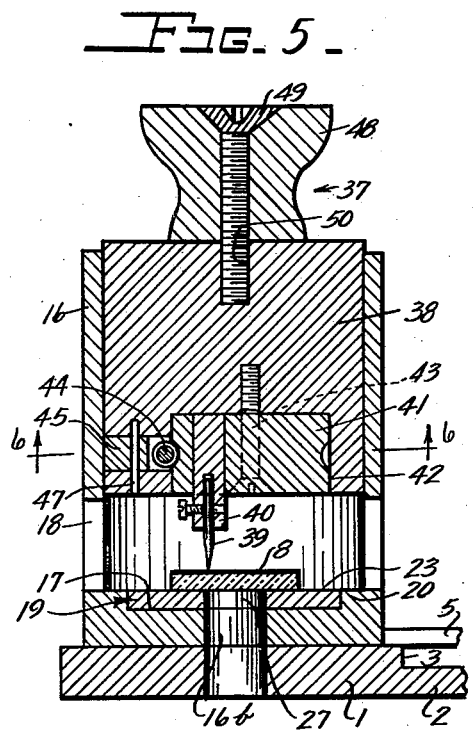
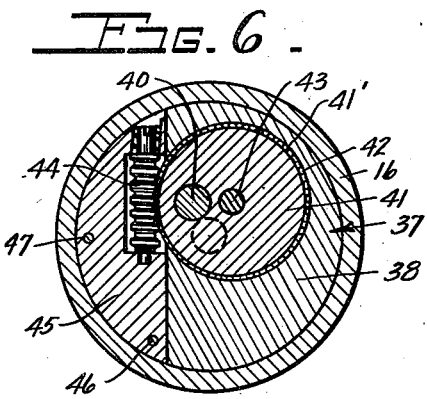
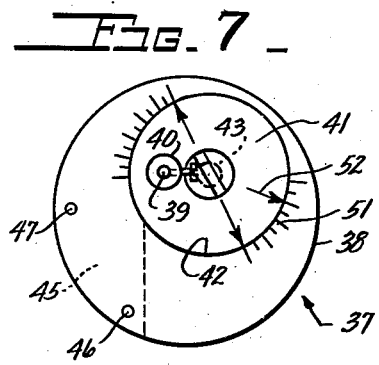
INVENTOR
SAM P. LEEPER
BY
ATTORNEYS Patented Dec. 7, 1948

2,455,372

UNITED STATES PATENT OFFICE 2,455,372

PORTABLE GUN SIGHT RETICULE
PRODUCING APPARATUS

Sam P. Leeper, Mineola, Tex.

Application March 24, 1944, Serial No. 527,904

8 Claims. (Cl. 33—27)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to improvements in portable gun sight reticule producing apparatus, and has for an object the provision of means for accurately producing reticule members of predetermined size for optical gun sights of the collimating type and similar devices.

An object of the invention is the provision of a simple and efficient portable optical gun sight reticule cutting kit which may be used out in the field for producing optical reticule mirrors for reflecting gun sights, including means for accurately inscribing the sighting circles or rings of any suitable predetermined diameters thereon.

A further object of the invention is the provision of a reticule producing device that is compact, light in weight, and easily manipulatable, even by an inexperienced operator in the field, to produce precision gun sight reticules for sights of the collimating type, in which means are provided for firmly holding the opaque reticule mirrors in position, and cooperating means for accurately centering and scribing the target rings through the opaque mirrored surface of the reticule blanks so as to produce a plurality of duplicate reticules of the class described having any predetermined sized sighting circle arrangements therein.

Other objects and advantages of the invention will become apparent from the following description taken in connection with the accompanying drawings in which like reference characters refer to like parts in the several figures.

Fig. 4 is a horizontal sectional view taken approximately on the plane indicated by the line 4—4 in Fig. 1.

Fig. 5 is a vertical sectional view taken approximately on the line 5—5 of Fig. 1.

Fig. 6 is a sectional view through the cutter cylinder assembly taken approximately on the line 6—6 of Fig. 5.

Fig. 7 is an end view of the reticule cutter cylinder body showing the scribing needle socket and preset graduations for adjusting the radial position of the needle.

Figure 1:
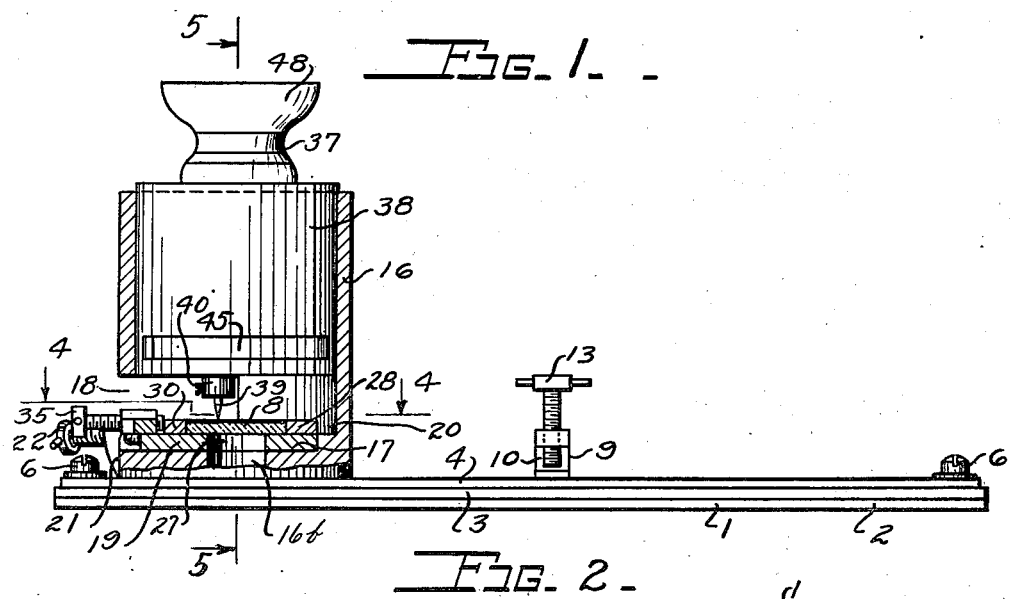
Fig. 1 is a side elevation of my improved reticule producing device, parts being broken away and shown in section.
Figure 2:
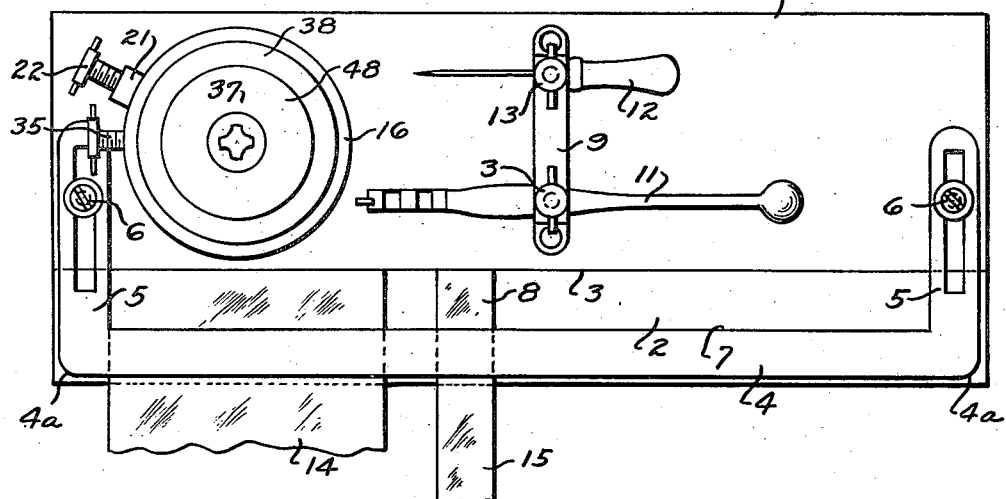
Fig. 2 is a top plan view of the device as shown in Fig. 1.
Figure 3:
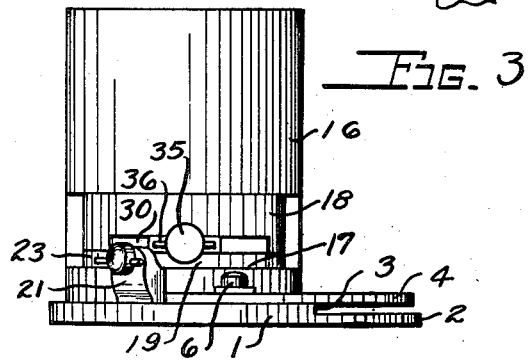
Fig. 3 is an end view.

Referring particularly to Figs. 1, 2, and 3 of the drawings, my improved reticule producing apparatus comprises a base or supporting plate indicated at 1, preferably of rectangular shape, formed with a step-down flanged portion or ledge 2, producing a straight vertical stop shoulder 3 with the main or body portion of the plate.

A U-shaped straight edge or guide member 4 is secured above the ledge by the laterally bent slotted extremities of the straight edge, as indicated at 5, and adjusting screws 6 are provided to adjustably clamp the straight edge 4 above the ledge 2 with the straight edge or guide portion 7 in parallel relation to the vertical stop shoulder 3 at a predetermined spaced relation thereto, representing the width of the rectangular reticule blank indicated at 8 in Fig. 2.

Suitably secured to the top of the supporting plate 1 is a glass cutter and screw driver holder 9 having each end recessed or socketed, as indicated at 10, to receive the respective glass cutter and screw driver tools 11 and 12. Clamping screws 13 are provided in the ends of the holder 9 adjustable to engage and retain the glass cutter and screw driver tools in the respective ends of the holder when they are not in use.

The width of the space between the lower surface of the straight edge 4 and the upper face of the supporting ledge 2 is equal to or slightly greater than the thickness of the mirror plate stock from which the reticule blanks are formed so that a sheet of the mirror plate stock having one straight edge may be inserted under the straight edge 4 and against the vertical shoulder 3, as indicated at 14 in Fig. 2 of the drawings. The glass cutter 11 is then drawn along the inner guide edge 7, cutting a narrow strip of the mirror stock with its opposite edges parallel, and due to the proper setting of the straight edge 4, the strip will have a width equal to the cross dimension of the reticule blank required. The plate may now be partly withdrawn and downward pressure on the outer edge will cause the sheet to break along the cutting line just described.

The strip left under the straight edge is now rotated 90° to position the same, as indicated at 15 in Fig. 2, with one squared end against the straight vertical shoulder 3, and the glass cutter is again used against the inner guide edge 7 to cut the reticule square blanks from the strip, downward pressure on the end of the strip causing the same to break into the flat squares or reticule sight blanks referred to. These blanks preferably have their corners chipped or rounded, as indicated at 8a in Fig. 4. The outer corners 4a of the U-shaped straight edge 4 are rounded so that the sharp corners of the reticule blanks may be inserted under these rounded corners 4a and moved upwardly, chipping or rounding the corners of the blanks.

A short, rather large diameter cylindrical, guide casing 16 is secured to the top surface of the supporting plate 1, this casing being open at its upper end and having its other end closed by the bottom or end portion 17, best seen in Figs. 1 and 5. The casing 16 is secured to the plate 1 by any suitable fastening means, such as screws 16a, threadably secured in the plate 1. A central passage 16b extends concentrically through the bottom or end portion 17 of the cylindrical casing and through the plate 1 to permit removal of dirt, chipped glass, or other foreign matter that might otherwise be trapped in the casing 16, preventing the reticule holder frame, later to be described, from properly seating on the inner surface of the closed end 17 of the casing 16.

One-half the lower portion of the side wall of the casing 16 is removed to provide a semi-circular opening 18 for the reception of the reticule blank holding frame, indicated generally at 19. The bottom portion of the cylindrical casing 16 is formed with a semi-circular ledge or projection 20 terminating at each end in alignment with the ends of the semicircular opening 18, as indicated at 20', and being of a height substantially equal to the thickness of the reticule blank holding plate 19.

On the front portion of the casing 16, intermediate the ends of the opening 18, is formed an upstanding bracket arm 21 in which is threadably disposed a clamping screw 22 adapted to engage the front edge of the blank holding plate or frame 19. Tightening of the clamping screw 22 forces the blank holding frame rearwardly against the ends 20'—20' of the semicircular ledge or projection 20. The reticule blank holding frame 19 comprises a flat plate 23 of somewhat annular form having a smaller semiannular portion 24 adapted to be received in the semiannular portion 24' of the casing 16 inside of the ledge 20 and the ends 20', the larger semiannular portion 25 extending from the ends of the smaller semiannular portion 24. At the ends of the semiannular portions 24, 25 are formed diametrically opposite stop shoulders 26 adapted to engage the ends 20' of the semicircular ledge member 20. The center of the frame 19 is also provided with a circular opening 27 adapted to register with the opening 16b in the base or lower end of the casing 16. The purpose of this opening 27 is to permit the reticule mirror blank to be supported around the outer portion only and to provide means whereby the blank can be easily lifted from the frame by the insertion of the finger in the opening 27 and raising the blank by upward movement of the finger.

Means are provided on the upper surface of the frame 19 for rigidly clamping and supporting the reticule blanks of predetermined rectangular dimensions in similar predetermined positions on the frame, this means comprising a pair of bar members 28 disposed at right angles to each other and secured to the face of the frame by rivets or other suitable fastenings 29, as shown in Fig. 4 of the drawings. These bars 28 are disposed on the smaller semicircular portion 24 with the angle therebetween facing forwardly toward the center of the larger semicircular portion. A blank clamping lever 30 is pivoted to the frame 19 at 31, and extends across the upper face of the frame, as seen in the drawings. The lever 30 is formed with a notch 32 disposed opposite to the angle between the two bar members 28 so as to receive one corner of the reticule mirror blank 8 when the opposite corner of the blank is disposed in the angle between the two bars. Preferably a leather strip or other suitable cushioning element 34 is interposed between the bars and the blank.

Tensioning means for the clamping lever 30 is provided in the form of a clamp screw 35 threaded through a threaded bore in a boss 36 formed on the front of the semicircular portion 25 of the frame 19, the clamping screw 35 engaging the clamping lever 30 directly behind the notch 32 in the lever.

A rotary cylindrical needle-holding body, best seen in Figs. 1, 5 and 6, and indicated generally at 37 in the drawings, is provided, and comprises a short cylinder 38, having a diameter just fitting the internal diameter of the cylindrical casing 16. This body member 38 is preferably solid to give the same sufficient weight to produce the desired downward pressure on the needle 39 carried in a needle socket 40 in a cylindrical insert 41. The cylindrical insert is rotatably adjustable in a cylindrical recess 42 formed in the lower portion of the cylindrical body 38. A headed screw 43 passes through the center of the insert 41 and is threaded into the body, this screw constituting a pivot post for the insert with the head of the screw retaining the insert in the recess 42.

The axial center of the recess 42 and the screw 43 is disposed excentrically to the longitudinal axis of the body 38, and the needle holder is fixedly disposed in the insert at a distance from the axial center of the insert substantially equal to the distance between the axial centers of the cylindrical body and the circular recess 42. This arrangement makes it possible to adjust the position of the scribing needle 39 to any position between the axial center of the cylindrical body and the maximum off-center position, as determined by the distance between the axis of the needle and the axis of the insert.

In order to provide precision radial adjustment of the needle or stylus 39, the periphery of the insert 41 is provided with worm gear teeth 41', suitably meshing with a finely threaded worm 44 carried in a segmental insert 45. The insert is secured by screws or pins 46 and 47 passing inwardly from the lower end of the body 38 through the insert. The worm 44 is secured in the insert against longitudinal play by any suitable means, such as a collar, press fitted into the bore formed in the segmental insert for receiving the worm. This collar engages a shoulder on the worm and holds the worm seated in its bearing socket at the other end. The collar forms a bearing at the outer end of the worm, and a portion of the worm shank projecting through the collar is provided with some turning means, such as a screw driver socket.

A rotating means for the cylindrical body 38 is provided in the form of a turning handle or knob 48 tightly clamped to the upper end of the body by clamping screw 49 threaded in a screw socket 50, as shown in the drawings.

Referring to Fig. 7, the lower face of the rotatable cutter cylinder 38 is preferably provided with scale indicia 51, and the insert 41, carrying the stylus holder, is provided with cooperating indicating arrows 52 so that the relative radial adjustment of the needle with respect to the axial center of the cylinder can be accomplished by reference to the cooperating indicia just referred to.

In the operation of the device, after the reticule blanks have been cut to the proper sized squares, as previously set forth, a blank 8 is placed in the blank holding frame 19 with its opaque backing surface facing away from the frame and the adjacent sides of the blank resting against the cushioned bearing members 28, the opposite corner of the blank being disposed in the notch 32 of the blank clamping lever 30. The clamping screw is first tightened to secure the blank in position and the frame 19 is then inserted in the base of the cylindrical guide casing 16. The clamping screw 22 is next tightened to secure the blank-holding frame 19 in a fixed position in the casing 16.

Depending upon the desired diameter of the target circle required on the reticule blanks, the worm 44 is rotated to radially adjust the needle-holding insert with respect to the center of the cylinder 38. The adjustment having been made, the cylinder is then inserted in the casing 16 and lowered until the needle or stylus 39 rests on the blank 8 carried in the blank-holding frame 19. The knob 48 is then grasped and rotated, causing the needle 39 to scrape the backing from the blank 8 in a circular path. This produces a transparent ring on the reticule blank, since the blank is made from a sheet of transparent material, such as glass, having an opaque backing in the form of a silvered or mirrored surface.

The cylinder 38 is then raised, the blank holder removed, and the reticule removed and replaced by another blank. From the above, it will be observed that any number of identical reticules may be produced by repeating the above operation, and the adjustment of the stylus by the worm 44 permits duplicate sight circles of any desired diameter to be formed on the reticule blanks. The apparatus is light in weight and therefore portable, and may be readily used in any field or air depot to produce replacement reticules.

Having thus described my invention, I claim:

1. In a reticule producing apparatus of the class described, a reticule blank holding frame, a support therefor comprising a cylindrical guide member having a supporting base, open at one side to receive the reticule blank holding frame, securing means on said cylindrical guide member adjacent the said supporting base for securing the blank holding frame on the supporting base in said cylindrical guide member, said reticule blank holding frame comprising a circular plate-like member adapted to rest on the supporting base, interiorly of the cylindrical guide member, and having reticule mirror blank positioning and clamping means thereon for securing reticule mirror blanks in identical predetermined positions on said blank holding frame, cylindrical reticule cutter holding means rotatably and axially movable within said cylindrical guide means, a needle holder radially adjustable thereon with respect to the longitudinal axis of the cylindrical reticule cutter holding means and extending toward said supporting base, adapted to receive a reticule cutting needle, and a handle member on the opposite end of the cutter holding member for rotating the same with the needle in contact with reticule blanks disposed in said blank holding frame.

2. In a reticule producing apparatus of the class described, a vertically disposed cylindrical casing having an open top, reticule blank holding means in the bottom for removably positioning a reticule blank in the casing at right angles to the longitudinal axis thereof, a weighted cylindrical reticule cutter member rotatably and axially movable in said cylindrical casing, having a radially adjustable longitudinally disposed needle holding means mounted thereon facing the blank holding means, adjustable between the axial center of the cylindrical cutter member and points radially spaced from said axial center, and handle means at the opposite end of the cylindrical reticule cutter member for axially moving said cylindrical reticule cutter member in the cylindrical casing into engagement with a reticule blank positioned in said blank holding means and rotating said cutter while in contact therewith.

3. In a reticule cutter of the class described, an elongated cylindrical casing open at one end and having reticule blank carrying frame supporting means at the other end, said casing being formed with a lateral opening adjacent said frame supporting means for inserting a reticule blank carrying frame into said cylindrical casing in supporting relation with said frame supporting means, a reticule blank carrying frame adapted to be inserted in said casing in supporting relation to said frame supporting means, positioning means between said frame and said frame supporting means for securing the frame in predetermined position on said supporting means, said reticule blank carrying frame having reticule blank clamping means thereon for holding a reticule mirror blank thereon in predetermined position with the mirrored surface facing upwardly, cylindrical reticule cutter holder means rotatably fitting said cylindrical casing and axially slidable therein, having excentrically mounted adjustable reticule cutter means projecting from one end thereof toward said reticule blank carrying frame, movable into scribing engagement with the mirrored surface of a reticule blank carried by the blank carrying frame, and rotatable with said cutter in engagement with said blank to scribe a target circle of predetermined diameter on said blank upon axial movement of the cylindrical reticule cutter holder means and rotative movement of the same.

4. In reticule producing apparatus of the class described, a vertically disposed cylindrical casing, cylindrical reticule cutter holding means rotatably and axially movable within said cylindrical casing, a reticule blank holding frame, means for removably securing said frame in said casing in predetermined centralized position with respect to the longitudinal axis of said casing, means on said frame for removably securing a reticule blank thereon in a predetermined centralized position, said cylindrical reticule cutter holding means having one end thereof facing said frame when the same is disposed in the casing, formed with a cylindrical recess therein disposed excentrically to the axis of rotation of said cutter holding means and facing the blank holding frame, and a cylindrical stylus cutter holding insert rotatably fitting the recess in the cylindrical cutter holding means, having an excentrically disposed stylus receiving socket formed therein.

5. In reticule producing apparatus of the class described, a cylindrical casing having one end opening upwardly, a substantially flat reticule blank holding frame, supporting means at the other end of the casing to receive and support said reticule blank holding frame at right angles to the longitudinal axis of the cylindrical casing, said casing having a substantially semicircular lateral opening formed therein adjacent the supporting means for receiving the reticule blank holding frame therethrough, securing means on the cylindrical casing engageable with said reticule blank holding frame when the same is inserted in said opening, to secure the same in predetermined position on the supporting means in the cylindrical casing, said reticule blank holding frame comprising a substantially flat body portion insertable into the lateral opening, having opposite lateral extensions thereon adapted to engage the cylindrical casing at the opposite ends of the blank holding frame receiving opening, reticule blank positioning means disposed on the blank holding frame for positioning a flat, substantially rectangular, opaque surfaced reticule blank in predetermined position on the flat body portion of the reticule blank holding frame with the opaque surface of the blank facing upwardly and the longitudinal axis of the casing extending substantially centrally through the blank at right angles to the plane of the blank, a cylindrical body rotatably and axially slidable within the casing having an operating handle at one end, and an excentrically disposed needle socket formed in the opposite end facing the blank, adapted to receive a scribing needle, whereby axial movement of the body toward the supporting means in the cylindrical casing brings the needle into contact with the blank, and rotative movement of the body scribes a target circle on the blank through the opaque mirrored surface of the blank.

6. In a reticule producing apparatus, a cylindrical casing, reticule blank positioning means removably disposed in said cylindrical casing having reticule clamping means thereon for removably holding a flat, substantially rectangular, reticule blank in predetermined centralized position with respect to the longitudinal axis of the cylindrical casing and adjacent one end of the casing, a cylindrical body fitting said casing having rotative movement and longitudinal movement therein toward and away from said reticule blank holding means, and radially adjustable needle holding means at the end of the cylindrical body facing the reticule blank holding means, adapted to receive a reticule blank scribing needle.

7. In reticule producing apparatus, a cylindrical casing, reticule blank positioning means removably disposed in said cylindrical casing having reticule holding means thereon for removably holding a flat, substantially rectangular, reticule blank in predetermined centralized position with respect to the longitudinal axis of the cylindrical casing and adjacent one end of the casing, a cylindrical body fitting said casing having rotative movement therein, and having axial movement toward and away from said reticule blank holding means, said cylindrical body having a circular recess formed in one end thereof excentric with respect to the longitudinal axis of said cylindrical body, a cylindrical insert rotatably fitting said recess having a needle socket formed therein excentric to the rotative axis of said rotatable insert, and adjusting means carried by the cylindrical body in engagement with the cylindrical insert for rotating the same to adjust the radial position of the needle socket with respect to the rotary axis of the cylindrical body.

8. In reticule producing apparatus, a cylindrical casing having an open upper end and reticule blank holding means disposed in the other end for removably holding a substantially flat reticule blank centralized in said other end of the casing in a plane at right angles to the longitudinal axis of the cylindrical casing, a cylindrical body rotatably fitting the interior of the cylindrical casing and axially slidable within said casing, said body having a circular recess formed in one end thereof facing said blank holding means with the axial center thereof excentric to the longitudinal axis of the cylindrical body and casing, an insert rotatably fitting said recess having a needle socket formed therein at a radial distance from the axis of rotation of the insert equal to the radial distance between the rotary axis of the insert and the longitudinal axis of the cylindrical body and extending substantially parallel to said axes toward the reticule blank holding means, and adjusting means in said cylindrical body engaging said insert for rotatably adjusting the insert within the cylindrical body to vary the position of the needle insert with respect to the longitudinal axis of the cylindrical body, whereby a plurality of reticule blanks having opaque coatings, when similarly positioned in the blank holding means with their opaque coatings facing the cylindrical body, may be identically scribed by rotation of the cylindrical body within the casing, with a scribing needle disposed in the needle socket at the lower end of the body in contact with the reticule blanks positioned in the reticule blank holding means.

SAM P. LEEPER.

REFERENCES CITED

The following references are of record in the file of this patent:

UNITED STATES PATENTS

| Number | Name | Date |
|---|---|---|
| 691,220 | West | Jan. 14, 1902 |
| 983,173 | Shuttleworth | Jan. 31, 1911 |
| 1,610,547 | Burda | Dec. 14, 1926 |
| 2,314,535 | Worden | Mar. 23, 1943 |